(12) United States Patent
Buisson et al.

(10) Patent No.: US 10,706,228 B2
(45) Date of Patent: Jul. 7, 2020

(54) HEURISTIC DOMAIN TARGETED TABLE DETECTION AND EXTRACTION TECHNIQUE

(71) Applicant: International Business Machines Corporation, Armonk, NY (US)

(72) Inventors: Jean-François Buisson, Geneva (CH); Keith D. Cramer, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 15/829,118

(22) Filed: Dec. 1, 2017

(65) Prior Publication Data

US 2019/0171704 A1 Jun. 6, 2019

(51) Int. Cl.
*G06F 40/00* (2020.01)
*G06F 40/12* (2020.01)
*G06F 16/00* (2019.01)
*G06F 40/177* (2020.01)
*G06F 16/332* (2019.01)
(Continued)

(52) U.S. Cl.
CPC ........ *G06F 40/177* (2020.01); *G06F 16/3325* (2019.01); *G06F 40/131* (2020.01); *G06F 40/163* (2020.01); *G06F 40/174* (2020.01); *G06K 9/00463* (2013.01); *G06K 2209/01* (2013.01)

(58) Field of Classification Search
CPC .......... G06K 2209/01; G06K 9/00469; G06K 9/2054; G06K 9/00449; G06K 9/00463; G06K 9/00442; G06F 17/2294; G06F 17/245; G06F 16/5846
See application file for complete search history.

(56) References Cited

U.S. PATENT DOCUMENTS 6,006,240 A 12/1999 Handley
6,647,156 B1 11/2003 Meding
(Continued)

OTHER PUBLICATIONS

R. Zanibbi et al., A Survey of Table Recognition: Models, Observations, Transformations, and Inferences, IJDAR (2004) 7: 1, http://research.cs.queensu.ca/home/cordy/Papers/IJDAR_Tables.pdf, Oct. 24, 2003.
(Continued)

*Primary Examiner* — Ariel Mercado
(74) *Attorney, Agent, or Firm* — Terrile, Cannati & Chambers, LLP; Michael Rocco Cannatti

(57) ABSTRACT

A method, system, and apparatus are provided for processing tables embedded within documents wherein a first table header is detected by using semantic groupings of table header terms to identify a minimum number of table header terms in a scanned line of an text document; a potential data zone is extracted by applying white space correlation analysis to a portion of the text document that is adjacent to the first table header; one or more data zone columns from the potential data zone are grouped and aligned with a corresponding header column in the first table header to form a candidate table; data cleansing is performed on the candidate table; and then one or more columns of the candidate table are evaluated using natural language processing to apply a specified table analysis.

20 Claims, 6 Drawing Sheets

(51) Int. Cl.
*G06F 40/131* (2020.01)
*G06F 40/163* (2020.01)
*G06F 40/174* (2020.01)
*G06K 9/00* (2006.01)

(56) References Cited

U.S. PATENT DOCUMENTS

| | | | | |
|---|---|---|---|---|
| 7,602,972 | B1* | 10/2009 | Wei | G06F 17/245 358/453 |
| 8,010,295 | B1 | 8/2011 | Magness et al. | |
| 2002/0178183 | A1 | 11/2002 | Meding | |
| 2010/0246958 | A1* | 9/2010 | Ma | G06K 9/00456 382/176 |
| 2011/0258195 | A1* | 10/2011 | Welling | G06K 9/00442 707/740 |
| 2014/0369602 | A1* | 12/2014 | Meier | G06K 9/00463 382/182 |
| 2016/0055376 | A1 | 2/2016 | Koduru | |
| 2016/0314104 | A1* | 10/2016 | Phillips | G06F 40/163 |
| 2017/0116179 | A1* | 4/2017 | Gagne-Langevin | G06F 40/226 |
| 2017/0154025 | A1* | 6/2017 | Dejean | G06F 17/245 |
| 2017/0351913 | A1* | 12/2017 | Chen | G06K 9/00449 |
| 2019/0129820 | A1* | 5/2019 | Thompson | G06F 11/2294 |

OTHER PUBLICATIONS

Petros Venetis et al., Recovering Semantics of Tables on the Web, Proceedings of the VLDB Endowment, vol. 4 Issue 9, Jun. 2011, pp. 528-538, http://ilpubs.stanford.edu:8090/1012/1/tables.pdf.

High, R., "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Stefan Klampfl et al., A Comparison of Two Unsupervised Table Recognition Methods from Digital Scientific Articles, D-Lib Magazine, Nov. 2014, http://www.dlib.org/dlib/november14/klampfl/11klampfl.html.

Tho Q. Luong, TrapRange: A Method to Extract Table Content in PDF Files, Apr. 28, 2015, https://dzone.com/articles/traprange-method-extract-table.

Yanna Shen Kang et al., Extracting laboratory test information from biomedical text, Journal of Pathology Informatics, 2013 https://www.ncbi.nlm.nih.gov/pmc/articles/PMC3779392/.

Martha O. Perez-Arriaga et al., Tao: System for Table Detection and Extraction from PDF Documents, Proceedings of the Twenty-Ninth International Florida Artificial Intelligence Research Society Conference, 2016.

\* cited by examiner

| | Result Identifier | Result | Reference | Units |
|---|---|---|---|---|
| 31 | Result Name | Result | Reference/Cutoff | Units |
| | Test | Normal \| Abnormal | Ranges | |
| | Test Name | Result/Status | Normal Range | |
| 32 | Tests | Results | Cutoff/Expected Value | |
| | Determination | Results/Units | Reference Ranges | |
| | | [Date 0]...[Date n] | Reference Interval | |
| | | | Reference | |

40

| TEST NAME | RESULT | UNITS | RANGES | ABN FL | ST |
|---|---|---|---|---|---|
| WBC | 5.8 | k/cumm | 4.0-10.5 | | F |
| RBC | 4.99 | m/cumm | 4.30-5.90 | | F |
| Hemoglobin | 14.5 | g/dL | 13.5-17.2 | | F |
| Hematocrit | 44.1 | % | 39.0-49.0 | | F |
| MCV | 88 | fL | 80-100 | | F |
| MCH | 29.0 | pg | 27.0-33.0 | | F |
| MCHC | 32.8 | g/dL | 33.0-37.0 | L | F |
| RDW | 11.9 | % | 11.5-14.5 | | F |
| Platelet Count | 165 | K/uL | 150-450 | | F |
| Neutrophils | 66.5 | % | 50.0-70.0 | | F |
| Lymphocytes | 24.1 | % | 20.0-50.0 | | F |
| Monocytes | 6.7 | % | 0.0-10.0 | | F |
| Eosinophils | 2.2 | % | 0.0-5.0 | | F |
| Basophils | 0.5 | % | 0.0-3.0 | | F |

41 = header row; 42 = data rows

HEURISTIC DOMAIN TARGETED TABLE DETECTION AND EXTRACTION TECHNIQUE

BACKGROUND OF THE INVENTION

Field of the Invention

The present invention is directed in general to the field of data extraction from documents. In one aspect, the present invention relates generally to a system and method for automatically detecting and extracting tables from electronic documents.

Description of the Related Art

A key function in computing systems, such as cognitive question answering (QA) systems, is the ability to ingest information from electronic documents and/or other corpus resources by detecting and transforming document information into a format that the computing system can process. However, the wide variety of information formatting in electronic documents creates challenges with correctly ingesting and processing the input information. For example, an input set of files or documents may include table data that needs to be evaluated, but the input tables are often formatted or laid out differently in terms of the information contained in a table, its table headers, table cell and column alignment, the table structure, etc. While there are table recognition solutions for identifying table data by using manual curation techniques, these solutions are slow, inefficient, and expensive. There are also automated table recognition systems and table recognition software (e.g., http://tabula.technology/) solutions, but such solutions are typically not able to detect tables in all possible formats, especially where the input file/documents contain table formats that differ from any example tables that were used to train such automated systems. Likewise, automated table recognition systems which use image pattern matching software to look for established patterns of data elements can also perform poorly when detecting unstructured tables that have different formats. Automated table recognition systems can also use generic recognition software that performs poorly in recognizing unique table entries, such as abnormal medical results flagged in medical data tables. In short, there are a great variety of computational approaches that have been applied to table recognition due to the wide variety of table characteristics, but each approach has its own tradeoffs and limitations. In addition, data extraction processing errors that arise during processing of the input files/documents can create additional challenges for correctly identifying and processing input table data. For example, an input PDF image file that is transformed with Optical Character Reading software (OCR) into text can include table data errors, such as word misspellings, garbage character insertion and text deletion caused during the transformation process. These errors can limit the ability of typical automated processes to be able to detect and extract unstructured tables that contain these OCR errors. As seen from the foregoing, the existing table detection solutions are extremely difficult at a practical level because of inefficiencies, cost, and inaccuracies caused by the challenges with processing unstructured table data that can be difficult to recognize, that can include data errors, and that suffers from other drawbacks and disadvantages, including but not limited to those identified herein.

SUMMARY

Broadly speaking, selected embodiments of the present disclosure provide a system, method, and apparatus for detecting and extracting table data from electronic documents with an information handling system that detects table-formatted data in a variety of different formats by using semantic groups of table header terms to identify table headers in an input document by detecting a threshold number of table header column matches, and then applying data zone grouping techniques, such as white space correlation rating techniques, to identify and align data columns with corresponding table headers. The semantic grouping technique creates a highly accurate targeted table type detection capability. In selected embodiments, data columns may be cleansed using heuristics based on text location averages to remove table comments and trailing or remnant lines from the end of the table. Once the table data is cleansed, a fully extracted table may be output for processing to identify abnormal result columns using one or more abnormal indication rules, and the final table output is generated with abnormal result table values flagged and marked with an associated confidence factor. In selected embodiments, the abnormal result table values are flagged by using a semantic grouping of header terms to identify one or more "result" columns and any "flag" columns which are tagged and processed to compare the "result" data with corresponding "range" data to confirm the "flag" entry. By using semantic grouping techniques to locate table headers which are then used to perform data zone extraction and column alignment with the table headers, data tables that are not clean and well-formatted table structures, that have data errors, and that come in many different formats, including new formats that have not previously been encountered, can be detected and abnormal result information can be extracted into a normalized format suitable for processing by other systems that need clean table inputs, such as cognitive systems. While suitably applied to detect and extract domain specific table data (e.g., medical data) from documents, it will be appreciated that selected embodiments may be applied to extract any kind of simple table data in other domains (e.g., financial data) by curating the semantic groups of table header terms to fit the domain of interest. The disclosed technique allows targeting of specific domain table data type and not just generic table detection. It further provides the ability to detect generic table formats within the targeted domain.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 4 is an example potential data zone identified in an input document in accordance with selected embodiments of the present disclosure;

FIG. 6 is an example extracted table that is processed to identify an abnormal results column in accordance with selected embodiments of the present disclosure;

FIG. 7 is an example extracted table that is processed to compare result data with corresponding range data to evaluate data in the abnormal results column in accordance with selected embodiments of the present disclosure.

DETAILED DESCRIPTION

Figure 1:
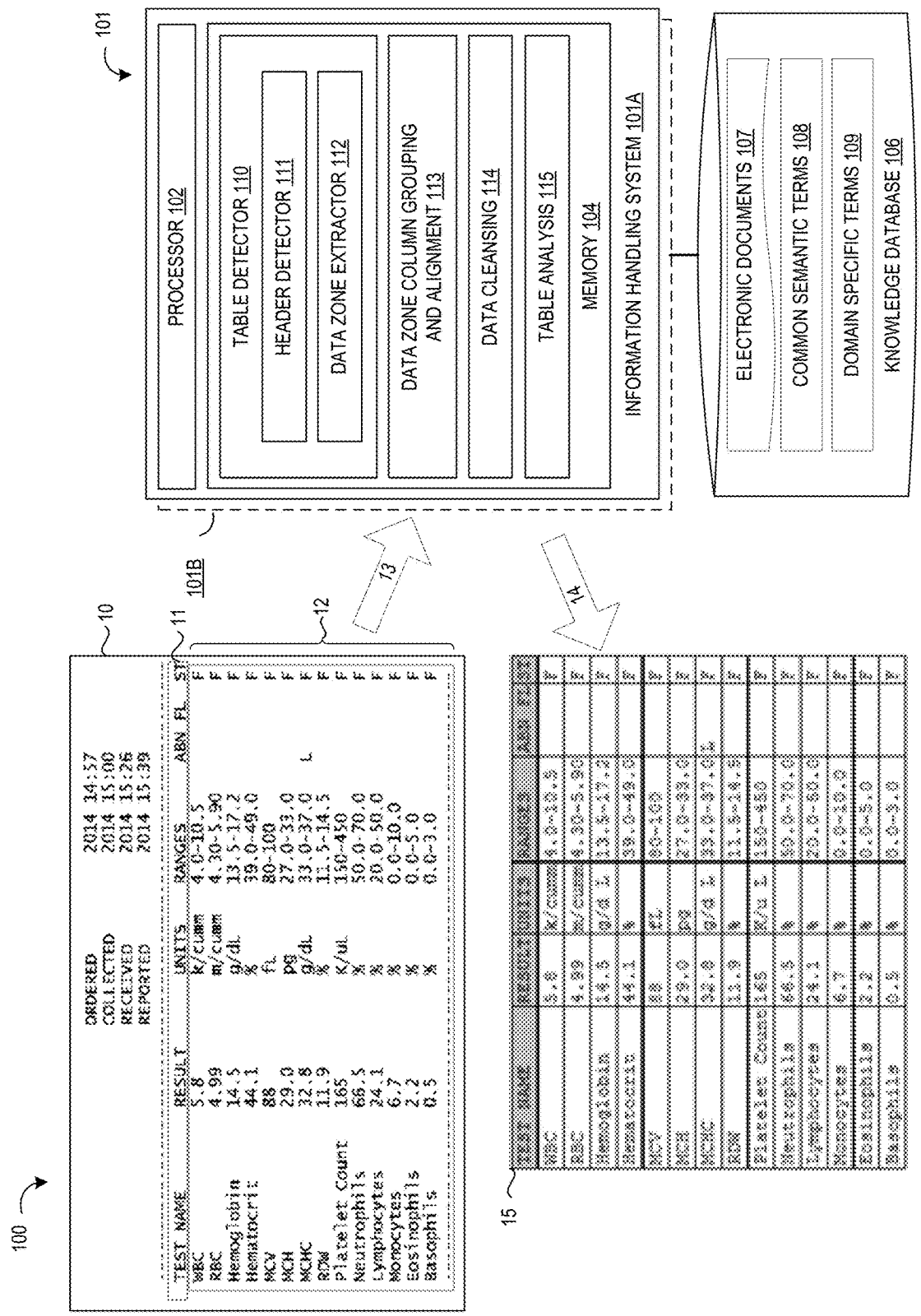
FIG. 1 depicts a table recognition system for processing an input document to extract table values using heuristic table detection and extraction techniques to identify table headers and data zones in the input document in accordance with selected embodiments of the present disclosure.

Embodiments of the present disclosure provide heuristic techniques for detecting and extracting table data from input documents by using semantic analysis to identify table headers and raw text analysis to extract table data. In selected embodiments, the semantic analysis applies semantic groups of table header terms to detect simple tables having any table format. The detection works without any training or table structure knowledge by the detection algorithm. The semantic group detection approach allows the detection of a wide variety of different table headers within the semantic domain where the target tables can use many different words for the actual column header and can detect the table headers even when the column positions are different for the same types of tables. Once table headers are detected, the raw text analysis identifies and classifies data that is part of the table, detects the termination of the table, such as by using a combination of an existing algorithm and a two-way columns processing based on data sets. In the medical document domain, the semantic analysis may be applied to detect any kind of lab results in any table format, even enabling unknown lab result table formats to be detected to extract the table data and identify abnormal results. Embodied in an information handling system device, input documents with embedded tables may be scanned and/or converted to embedded text documents and then processed by applying semantic group files to detect table headers, extract and align data zone columns, and output candidate tables for cleansing and final processing.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To provide additional details for an improved understanding of selected embodiments of the present disclosure, reference is now made to FIG. 1 which depicts a table recognition system 100 which includes an information handling system computer 101 for processing one or more input documents 10 to extract table data 15 using a table detection engine 110 that applies heuristic table detection and extraction techniques to identify table headers 11 and data zones 12 in the input document(s) 10 in accordance with selected embodiments of the present disclosure. The term "computer" is used herein for convenience only, and in various embodiments is a more general data handling system, such as a mobile phone, tablet, server computer, etc. The mechanisms and apparatus of embodiments of the present disclosure apply equally to any appropriate information handling system. In selected embodiments, the information handling system computer 101 may include one or more cognitive question answering (QA) system pipelines 101A, 101B, each of which includes one or more processors 102, a main memory 104, and potentially any other computing device elements generally known in the art including buses, storage devices, communication interfaces, a terminal interface, a storage interface, an I/O (Input/Output) device interface, and a network adapter communicatively coupled, directly or indirectly, for inter-component communication via a memory bus, an I/O bus, and an I/O bus interface unit. In selected embodiments, the processor 102 may contain one or more general-purpose programmable central processing units (CPUs), each executing instructions stored in the memory 104 which may include one or more levels of on-board cache, RAM, ROM, non-volatile memory, based on input and/or output data, such as electronic documents 107, common semantic terms 108, domain specific terms 109 stored in memory 104 and/or external knowledge database storage 106.

In an example medical data review, the information handling system computer 101 may be embodied as an IBM Watson computer that is connected to receive an input document 10 which contains medical data. To evaluate the individual health status the input document 10 may be ingested as part of an input set of files (or "case") being evaluated by the IBM Watson cognitive machine 101. However, with medical data documents and other types of documents, table data may not be provided in clean, well-formatted table structures, and instead may be provided in semi-structured text blocks which can have numerous problems. These problems can include data errors created as part of the OCR conversion process (that can obscure table headers and data), embedded text lines/comments (which are not table data), misaligned column headers (that do not line up or exactly match with column data), the absence of clear table delineations (making it difficult to determined when the data table has ended), and inconsistent ways for marking abnormal test results (such as including an "Abnormal" column with flagged entries, or appending a suffix "A" to the end of abnormal test data). In addition, the input case may include multiple pages that are concatenated together as a single PDF image file, sometimes including tables that span multiple pages, such as when an individual case includes multiple years of medical records. In addition, different cases can contain information for the individual that was generated by different medical facilities which can each generate medical records with different table formats and layout of data. For example, an Attending Physician Statement (APS) medical record for each applicant can include medical file information from many different medical providers. An APS section can represent many different clinical/hospital visits by the patient, APS sections listing lab or medical test results from physician ordered lab tests, APS sections listing acceptable ranges for the lab results, and even table entries flagging certain results as being outside of a prescribed range. With this wide variety of table formatting approaches and associated problems with semi-structured tables in the input document 10, it is critical to be able to correctly identify and evaluate all APS lab results and detect any abnormal test results so they can be flagged.

To address these needs and other deficiencies associated with conventional solutions, the information handling computer system 101 uses a table recognition engine 110-115 to detect simple tables (e.g., lab results for a patient) and extract the table data information into a normalized format that the Watson cognitive machine 101 can process. To this end, the table recognition engine 110-115 may be stored in memory 104 and connected or configured to receive (input arrow 13) an input document 10, such as, for example, a PDF image case file 10 containing table data in an unformatted or semi-formatted form.

Once an input document 10 is received or scanned into a text format document (input arrow 13), a table detector engine 110 may detect unstructured table headers and data zones 11-12. In particular, the table detector engine 110 may include a header detection module 111 which is configured to detect unstructured table headers 11 by using semantic groups of table header terms to identify any type of lab results or other data in any table format without requiring any training or table structure knowledge. To detect a header term in the input document 10, the header detection module 111 scans each line of the input document 10 to look for identified common semantic terms 108 which are typically used for table headers in a target domain (e.g., medical data). For example, with common semantic terms 108 identifying a first group of header terms (e.g., "Result Name," "Test," "Test Name," "Tests," and "Determination") that corresponds to a "Result Identifier" semantic category, the header detection module 111, upon scanning a line 11 of the input document 10, could apply a fuzzy matching algorithm to detect the term "Test Name" (first column) that matches one of the first group of header terms that corresponds to the "Result Identifier" category. In some tables, the column positions are different for the same table type. For example, some lab result tables may specify "Test" in the second column, and "Test Name" in the third column, while a lab result from a different clinic can reverse this column order. The detection algorithm will attempt to find a semantic match for all combination of column orders in the semantic group definition input file. The fuzzy matching algorithm will also attempt to detect table headers by doing a fuzzy match check for candidate lines of text against the semantic groups. If a specified minimum number of additional header terms were also identified in the scanned line 11 of the input document 10, the header detection module 111 would then identify the line 11 as a table header. Using the semantic grouping approach prevents false positive tables from being treated as candidate tables which is an approach that generic table detection algorithms typically take. Once table headers 11 are detected in an input document 10, the table detector engine 110 may use a data zone extraction module 112 which is configured to identify and extract a potential data zone 12 associated with the detected table headers 11 by using raw text analysis and/or parsing logic to identify and classify data 12 that is part of the table. The data zone extraction module 112 may use any suitable technique to make informed guesses as to how the table is structured, such as, for example, a data zone extraction approach that is loosely based on the white space correlation function described by J. Hu et al., "Medium-independent Table Detection," Proc. Of Document Recognition and Retrieval VII, Vol. 3967, pp. 291-302 (2000).

Once the table detector engine 110 identifies a candidate table, a grouping and alignment engine 113 may process the candidate table to extract and group table values into columns for alignment with the identified table headers, such as by refining the overall results in the candidate table with heuristic algorithms based on text locations. The extracted table values may then be cleansed with the data cleansing engine 114 to improve table end detection and remove extraneous comments so that the final output table 15 is saved (output arrow 14) with a structured format which the Watson cognitive machine 101 can use to match against the domain specific terms 109.

In the process of generating the final output table 15, a table analysis engine 115 may also evaluate one or more table columns against one another in the final output table to perform a specified table analysis. For example, a medical record table may be evaluated by the table analysis engine 115 to identify or flag abnormal result columns or values with an associated confidence factor, such as by using data set techniques to parse specific table cells and retrieve the critical health values which are flagged as being "abnormal" for comparison to a retrieved set of "range" values, thereby confirming, correcting or otherwise flagging the identified table entries.

Figures 2, 3:
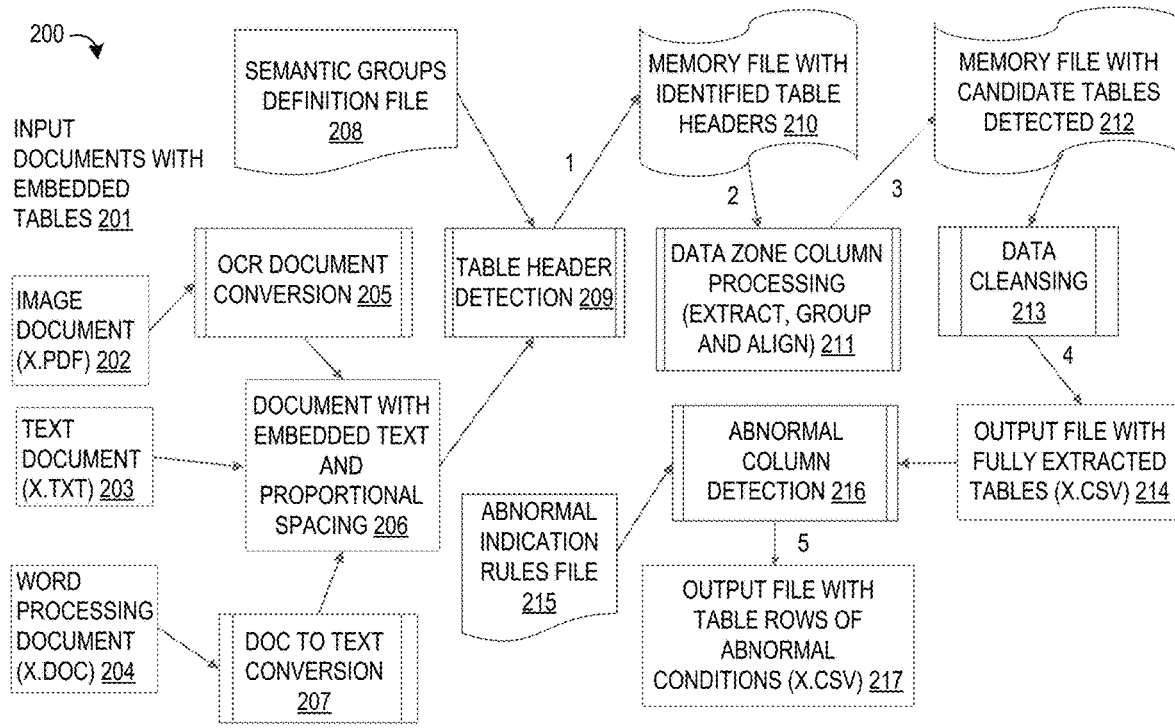
FIG. 2 is a simplified flow diagram of processing steps for detecting, extracting and processing table data in accordance with selected embodiments of the present disclosure.
FIG. 3 is an example semantic grouping table of header terms in an example medical table domain wherein common header terms are grouped together for predetermined tables.

To provide additional details for an improved understanding of selected embodiments of the present disclosure, reference is now made to FIG. 2 which depicts a simplified flow diagram of processing steps 200 for detecting, extracting and processing table data, such as medical lab results within a medical document, through the process could be applied to solve similar table detection problems in other domains. Illustrated with reference to a five step algorithm, the processing steps 201-217 include a table header detection step 209 which uses semantic grouping to identify table headers (step 1), a data zone extraction step 211 which uses space correlation to identify potential data zones (step 2), a data zone grouping and alignment step 211 for aligning columns and headers (step 3), a data cleansing step 213 for putting the extracted table data in final form (step 4), and a data analysis step 216 for identifying critical or abnormal health information identification in the final table (step 5).

In operation, the process 200 receives one or more input documents having embedded tables 201, such as an image document 202 (e.g., a .pdf file), a text document 203 (e.g., a .txt file), or a word processing document 204 (e.g., a .doc file). Using any suitable document conversion process, the input document(s) are converted to an input document 206 having a predetermined format, such as a text format having proportional spacing. As illustrated, the conversion processing may include an OCR document conversion process 205 for converting pdf documents 202, a Word-to-Doc conversion process 207 for converting Word documents 204.

The input document 206 is first processed (step 1) with a table header detection process 209 which uses a file of semantic groups definitions of table header terms 208 to identify a minimum number of table headers, and if so, to store the identified table header information in memory 210. To assist with table header detection processing 209, the file of semantic groups definitions 208 is assembled as a "common terms" table by parsing a representative sample number of medical tables (e.g., 100) to extract semantic meanings for common header terms. With the common terms table, a dictionary-based approach may be applied to find terms in the input document 206 which match the semantic meaning of the "common terms" table 208. While the set of terms in the table 208 is not exclusive, it defines a minimum set of represented knowledge concerning common table header terms, and can be enriched or expanded if other non-identified terms are discovered and added to the common terms table.

In selected embodiments, the file of semantic groups definitions 208 may embody a data set approach for handling lab result tables with many different formats where the columns can represent different data elements in any combination of order. For example, an XML file definition can be used in the semantic groups definitions 208 for potential column header values that are found in all common lab result tables. These defined columns include a larger variation of possible column header names (e.g., "Result Name," "Test," "Test Name," "Tests," and "Determination") and are unordered. This solution can support multiple written languages by using multi-lingual XML definition files. For example a separate XML file with French language words for the medical terms can be included so that the algorithm can correctly identify tables in an input French language medical record. Different lab result formats have common elements that are the definition of a lab test. Examples of common elements in lab results include:

Test category: (e.g., Serum Blood test)
Test indicator (e.g., GLUCOSE)
Test measure (e.g. 71)
Normal measure range (e.g. 60-109)
Test measure units (e.g., MG/DL)

With different labs using different names and formats for these common elements and presenting the data with many different orders of column values, the table header detection process 209 is configured to handle a data set that includes a universe of possible values.

To provide an example of a file of semantic groups definitions 208 in which common header terms are semantic grouped together, reference is now made to FIG. 3 which shows a semantic grouping table 30 in which each column category of header terms 31 in an example medical table domain has a corresponding group of common header terms 32. As depicted, the top row 31 is the semantic category for a table column, and the subsequent rows are possible values that can be found in different table implementations for the problem domain. In this example, the row data 32 represents text headers found in many different types of medical blood test result tables. Thus, the "Result Identifier" column category has a first group of corresponding terms (Result Name, Test, Test Name, Tests, Determination), the "Result" column category has a second group of corresponding terms (Result, Normal Abnormal, Result/Status, Results, Results/Units. [Date 0] . . . [Date n]), the "Reference" column category has a third group of corresponding terms (Reference/Cutoff, Ranges, Normal Range, Cutoff/Expected Value, Reference Ranges, Reference Interval, Reference), and the "Units" column category has a fourth group of corresponding terms (Units). While this example semantic grouping table 30 defines four categories to provide the base knowledge represented by a laboratory result table, the table header detection processing 209 may use this table 30 to correctly identify a table if minimum of two header topic categories are detected when scanning a line of the input document to look for identified common semantic terms from the table 30. With the example input document 10 shown in FIG. 1, the scanned line 11 is identified as a table header since the scanned "TEST NAME" term matches with the "Result Identifier" column category and the scanned "RESULT" term matches with the "Result" column category.

For purposes of illustration, an example pseudocode sequence is shown below which could be used by the table header detection processing step 209 to scan each line of an input document to detect table headers if at least two matching terms for semantic categories in the semantic table 30, and then create table header if there are at least two matches:

Table header detection pseudocode:

```
For (each line of text) {
    if (line contains at least two semantic categories) {
        create table header (line tokenized on more than one space char);
    }
}
```

As will be appreciated, the table header detection processing 209 may detect matches by applying any suitable matching algorithm, such as a fuzzy match processing (e.g., Least Common String or Levenshtein distance matching). In addition, the table header detection processing 209 may be flexibly applied as new test types with new column headers are found in the future by simply expanding the table 30 to include an additional column category of header terms 31 along with corresponding group of common header terms 32. In addition, the table header detection processing 209 may be used with any domain of interest by simply constructing a new semantic grouping table 30 with domain-appropriate header terms.

By specifying that only a minimum threshold number of table terms (e.g., 2) must match for a table header to be detected, the table header detection processing 209 helps protect against OCR errors in one table header if the minimum threshold number matching table terms is detected from other columns. This minimum threshold feature also enables the table header detection processing 209 to support new table headers (e.g., new test types) since only a subset of the actual column headers must match. In this way, the table header detection processing 209 supports identification of unknown table structures based on the matching semantic meaning of known table header terms. Another benefit of matching a threshold number of terms from a universe of possible values in the semantic grouping table is the ability to detect new table types having a different ordering of columns than previously seen.

Once a table header location has been detected at step 209, the input document 206 is next processed (step 2) with a data zone processing step 211 which identifies a potential table data zone in the memory file 210. In selected embodiments, the data zone extraction processing 210 applies a white space correlation function. Starting from the table's header location, each line of text is compared to the next one to see if the words tokens position is preserved. When a structure change is detected with the correlation function, the table zone end is marked. This process is refined in a later step with heuristic algorithms to even better detect the table zone end location.

For purposes of illustration, an example pseudocode sequence is shown below which could be used by the data zone extraction processing step 210 to implement a white space correlation function which identifies text blocks in each line that are separated by a minimum specified spacing and also looks ahead a specified number of lines (e.g., 5) to identify data zones in tables that cross over a comment or multiple pages. The "rate" function compares the current processed line of text with the next one and the header. If one or both have matching structures (i.e a positive rating) the processed line is added to the data zone. If not, we further process a configurable amount of lines (5 in the example) to see if there is a chance that the table structure continue on the next page, or after some embedded comments.

Data zone extraction pseudocode:

```
While (following lines of text) {
    if (rate (line against: header, following lines) > 0) {
        potentialDataZone add(line)
    } else (if rate > 0 in next 5 lines) {
        potentialDataZone add(next 5 lines)
        current line = next matching line
    } else if (rate <= 0) {
        break;
    }
}
```

In this example pseudocode, the data zone extraction processing 210 processes the portion of the input document 206 at the location of the detected table header to identify and output lines of text for a candidate table. To provide an example output 212 from the data zone column processing step 211, reference is now made to FIG. 4 which shows an example potential data zone 42 extracted from the input document 10 shown in FIG. 1. The detected header 41 is a line of text listing the detected header terms, TEST NAME, RESULT, UNITS, RANGES, ABN FL, and ST. In addition, the data zone 42 includes multiple lines of text, each including a set of candidate table entries (e.g., WBC, 5.8, k/cumm, 4.0-10.5, F) which are generally aligned to form a potential column under each table header entry.

To the extent that the data zone processing step 211 identifies the table content as lines of text, the processing 211 should also group potential data zone columns together for alignment with the identified table headers. To this end, the input document 206 is next processed (step 3) at the data zone column processing step 211 to align columns and headers, such as by applying natural language processing (NLP) techniques to format the lines of text as table rows and columns by using a classification process to associate sets of words with average locations. In an example embodiment, a two-step classification process is used to create table columns based on potential data zone locations only, and to then refine the column definitions using their average location compared to the table header column locations.

In the first step of the classification process, each line may be tokenized based on a specified spacing distance (e.g., more than two space characters), creating a set of tokenized words with a specified x (horizontal spacing) location and y (vertical spacing) location in the text. Then, the tokenized words are grouped into table columns, where each table column stores the tokenized words which share a location within a configured range. The columns object stores the average x location of all its words tokens. Each time a tokenized word has an x location that does not match an existing column average within a specified margin, a new column is created. At the end of the first step, a set of columns is generated where the tokenized words are grouped by their x location, with each column having information of the average x location. Generally, more columns are identified by the data zone column processing step 211 than the number of columns found in the detected table header. The advantage of working on the potential data zone only is that complete words can be extracted that will not be cut due to headers locations or predefined columns start and end ranges.

In the second step of the classification process, the set of columns generated in the first step is assigned or associated with corresponding header column locations. By using the previously computed average x location for the column, the data zone column processing step 211 detects whether a column's average x location differs from a header column location by less than a configurable or parametrized amount. If so, then the column's content is dispatched or assigned to the header column. But if the column's average x location differs from the header column location by at least the configurable or parametrized amount, then the column's content is assigned to an empty header column (typically for situations where a detected table does not include a first column header, the data zone column processing step 211 may be configured to create an empty dedicated header column). At the end of data zone column processing step 211, candidate tables are identified and stored in memory 212 having columns mapped to the corresponding header locations.

Figure 5:
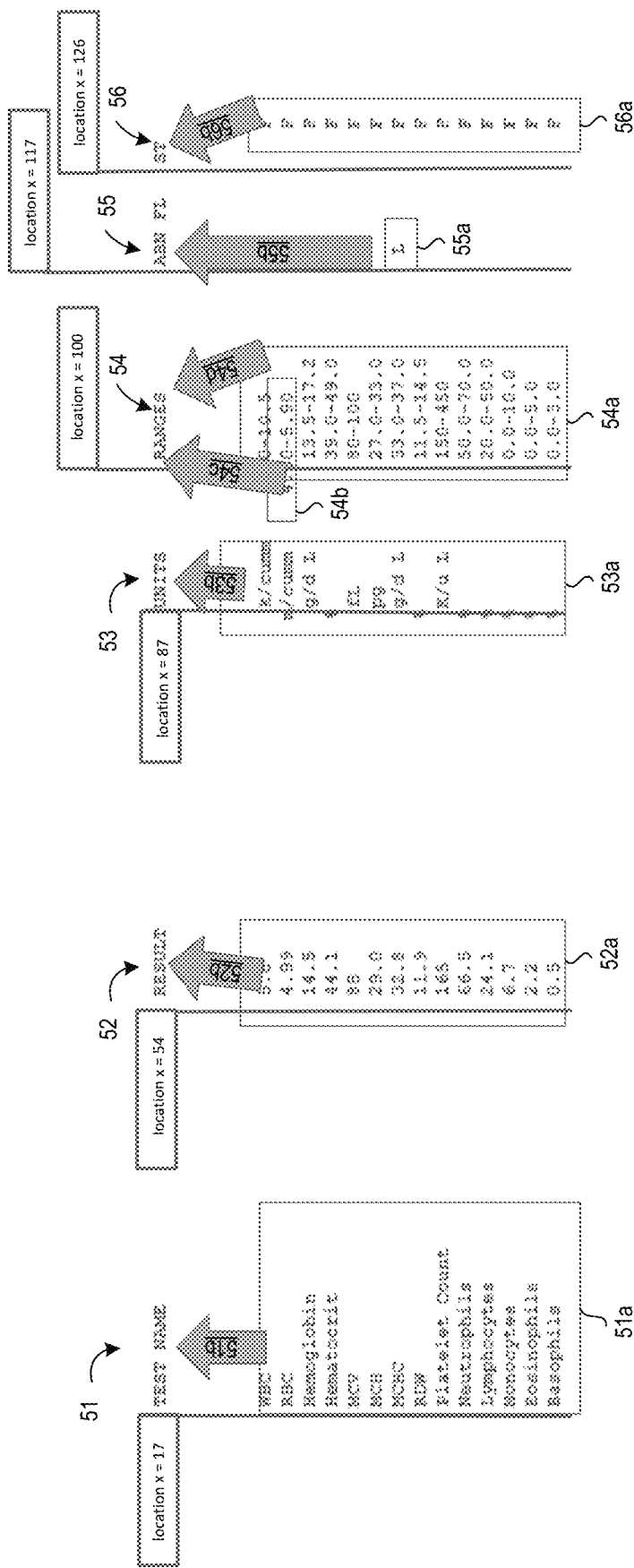
FIG. 5 illustrates how extracted data zone columns are aligned with header columns in an example candidate table in accordance with selected embodiments of the present disclosure.

To provide another example output 212 from the data zone column processing step 211, reference is now made to FIG. 5 which illustrates how extracted data zone columns 51a, 52a, 53a, 54a, 54b, 55a, 56a are aligned with the closest header columns 51-56 for output as part of a candidate table 15 as shown in FIG. 1. With the first depicted column set 51a having the same x-position as the first column header entry 51 (TEST NAME), the alignment process 51b maps the column set 51a to the corresponding x-position (e.g., x=17) of the first header 51. However, with the second depicted column set 52a having an x-position (e.g., x=52) that is offset slightly from the x-position (e.g., x=54) of the second column header entry 52 (RESULT), the alignment process 52b reconciles the position of the column set 52a to the corresponding x-position (e.g., x=54) of the second header 52 in the final table. In similar fashion, the third depicted column set 53a has an x-position (e.g., x=86) that is offset slightly from the x-position (e.g., x=87) of the third column header entry 53 (UNITS), causing the alignment process 53b to reconcile the position of the column set 53a with the header 53 in the final table. In a case where there are multiple column sets (e.g., 54a, 54b) having x-positions that differ from the x-position (e.g., x=100) of the fourth column header entry 54 (RANGES), separate alignment processes 54c, 54d are applied to reconcile the position of the column sets 54a, 54b to correspond to the header 54 in the final table. And similar alignment processes 55b, 56b are applied to the adjust the respective positions of the column sets 55a, 56a to correspond to the headers 55, 56 in the final table.

To account for errors in the table extraction processing at steps 209-212, one or more data cleansing process steps 213 may be applied (step 4) to the candidate table 212 which is formatted to include a table header and aligned cell columns, but may also include some additional non-table text, such as comments or trailing lines of text at the end of the table. For example, the data zone column processing step 211 may extract and add a few more lines at the end of the extracted table. To address this, a data cleansing process 213 may apply heuristics based on text location averages to remove the extra lines, such as by removing one or more of the last table lines that are not aligned with the average first column location, potentially indicating a mismatch. In addition, or in the alternative, the data cleansing process 213 may apply a grouping algorithm for the last lines mismatches to remove matching lines in a lines group. At the end of the data cleansing process step 213, the fully extracted, final table is stored as an output file 214 in a predetermined output table format, such as a comma-separated value (CSV) file. To provide an example output 214 from the data cleansing process step 213, reference is now made to FIG. 1 which shows an example extracted table 15 having a well formatted structure with a header row and one or more columns extracted from the input document 10.

In this well-formatted structure, the extracted table 15 can be processed by the Watson cognitive machine 101 to analyze the table data. For example, with a medical table 10 correctly detected and extracted, the Watson cognitive machine 101 can parse specific table cells and retrieve the critical health information that is mentioned or flagged as "abnormal" values, such as by applying an abnormal column detection processing step 216 to identify and process critical health information in the table (e.g., abnormal health results) using one or more abnormal indication rules 215 so that the final table output 217 is generated with abnormal result table values flagged and marked with an associated confidence factor. A rules file is used to specify what constitutes as abnormal table row for the specific domain, such as medical test.

Figures 6, 7:
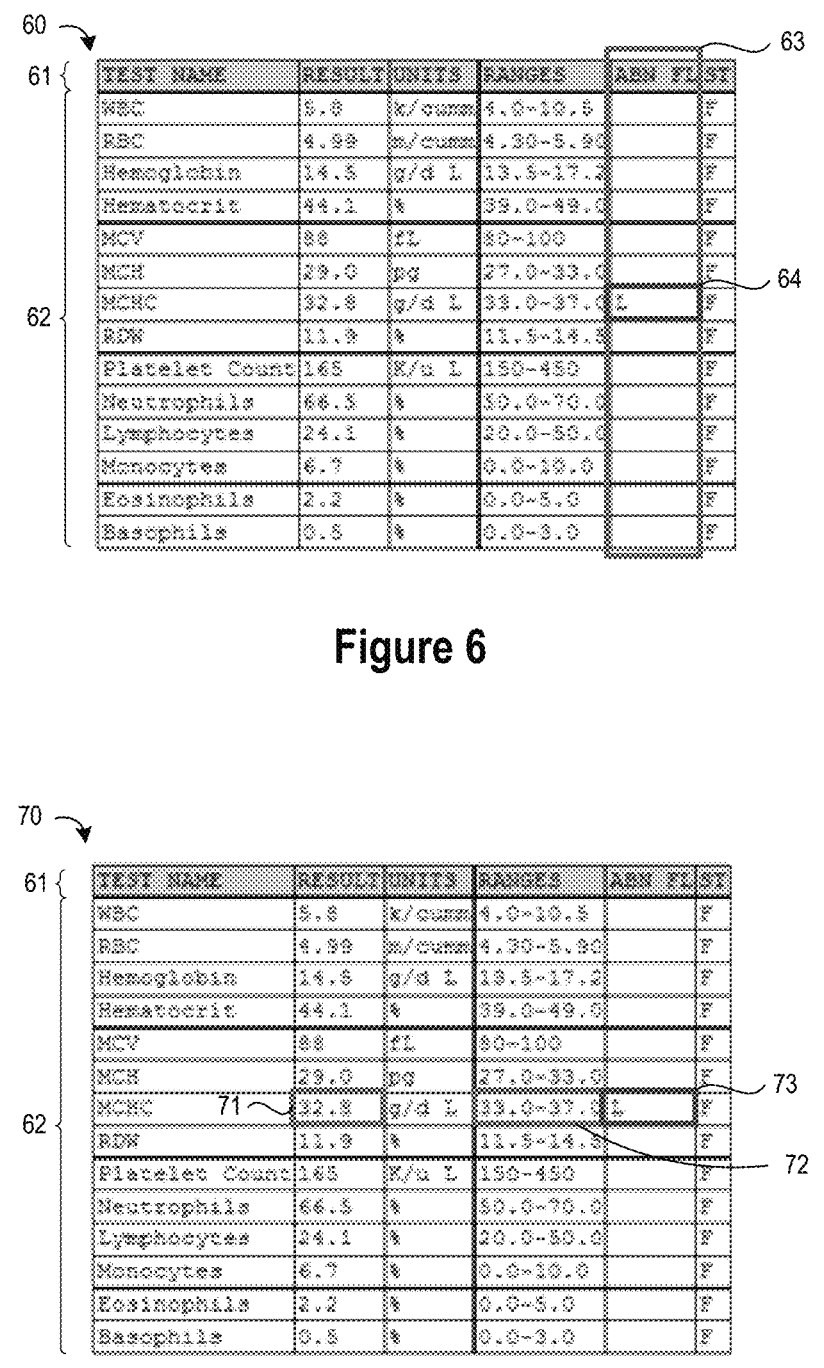

To provide a detailed example of how an extracted table can be processed to identify abnormal results, reference is now made to FIG. 6 which depicts an extracted lab result table 60 which includes a top row 61 of header terms (TEST NAME, RESULT, UNITS, RANGES, ABN FL, and ST) and a plurality of result rows 62 arranged in aligned columns under the header terms. As illustrated, each result row (e.g., MCHC) in the laboratory results table 60 includes a "Result" column category for every kind of lab (e.g., 32.8) and an associated abnormal indication column (ABN FL) which may be marked with a flag (e.g., high (H) or low (L)) to highlight and enforce abnormal results. To identify the "Result" column(s), the common terms table may be applied to detect a "Result" category that could be either a single column containing all the values, or two columns, in the case the values are divided into normal and abnormal categories. Additionally, those results can be extended with the abnormal indication column which clearly flags the result as normal or abnormal (e.g., L or H).

In selected embodiments, the processing of the extracted lab result table 60 by the abnormal column detection processing step 216 may employ a multi-step algorithm process in which the initial step(s) are dedicated to extracting the desired table columns and results that are relevant to an abnormal result, and the final step(s) are dedicated to using the extracted table information for knowledge reinforcement. For example, if the first three steps are used to extract critical health information and the fourth step is a knowledge reinforcement step, then a confidence factor may be computed based on the results of the multi-step algorithm. In particular, if any of the first three extraction steps is positive and the fourth step is positive, this results in a 100% confidence indicator. However, if only one of the first three extraction steps is positive, this results in a 75% confidence indicator. And if only the fourth step is positive, this results in a 50% confidence indicator. Finally, if there are no positive results from any of the steps, this results in a confidence of 0%, indicating a need for additional manual review.

In an example embodiment, the abnormal column detection processing step 216 may perform a first extraction step to identify one or more "Abnormal" columns in the table 60 as part of a compound "Result" category. In this step, a dictionary-based approach may be applied in combination with a fuzzy match algorithm to find column headers that match predefined terms (Abnormal, ABN, Out of Range . . . ) specified in the semantic groups definition file 208. Since matching is not applied to a single term, the fuzzy matching helps detect referenced column headers referenced containing OCR errors. In the processing of this first extraction step, every table line having some data in the identified "Abnormal" column 63 (ABN FL) is marked as a health risk factor. In the example table 60 of FIG. 6, the first step does not locate a header column that is labeled "Abnormal," so the processing proceeds to the second extraction step.

In a second extraction step, the abnormal column detection processing step 216 identifies any tagged results within a "Result" column, or series of "Result" columns (single columns for different dates). In this step, the abnormal column detection processing step 216 looks for an indicator flag in the table entries of any "Result" column(s). If a "Result" category is made of a single column, or a timeline column series, any flag values (e.g., H, L, Low, High, N, Normal . . . ) within the table entries of these columns are identified, such as by using regular expressions to extract the numerical value(s) from the table entry/cell and then check the rest of the cell content for a non-numerical entry. If the cell is not empty, a "Flag" dictionary is parsed to know if the associated String content (e.g., the non-numerical entry) is a flag indicator. If the remaining cell content corresponds semantically to an abnormal "flag" value, the whole line is identified as a health risk factor. In the example table 60 of FIG. 6, the second step does not find an indicator flag in table entries of the "Result" column, so the processing proceeds to the third extraction step.

In a third extraction step, the abnormal column detection processing step 216 identifies a "Flag" column in the table 60 to cover situations where a table include a dedicated column where an abnormal value is explicitly mentioned. In this step, a dictionary-based approach may be applied in combination with a fuzzy match algorithm to detect a "Flag" column 63. And once a "Flag" column is detected, the abnormal column detection processing step 216 uses the "Flag" values dictionary (e.g., H, L, Low, High, N, Normal . . . ) to detect any abnormal values in the column. In the example table 60 of FIG. 6, the third step finds a column 63 with an "ABN FL" header in which an indicator flag value 64 (e.g., "L") is found.

In the fourth "knowledge reinforcement" step, the abnormal column detection processing step 216 performs a validation check to validate any extracted abnormal flag indicator(s) (from extraction steps 1-3) by comparing extracted "Result" and "Range" values. In the example table 70 of FIG. 7, the processing compares the result data 71 with corresponding range data 72 to evaluate an abnormal flag data 73 (e.g., L) in the abnormal results column (ABN FL).

In this step, a combination of a dictionary-based detection and fuzzy matching logic may be applied to identify the "Range" category column (e.g., RANGES) using semantic group matching (Reference/Cutoff, Ranges, Range, Normal Range . . . ) and then extract the corresponding range value 72 (e.g., 33.0-37.0) from any detected column, with the range value usually being numeric values, though it could also be a simple text string, usually a Boolean indicator to express a negative of positive result. For example, the range itself may be extracted with a regular expression pattern matching:

(\\d+(.\\d+)?\\s)?[=><+−]{1,2}\\s{2,15}\\d+(.\\d+)?"

In case no match is found, the abnormal column detection processing step 216 may use a String if matched within the "negative", "positive" values dictionary. Depending on structure of the extracted "Range" value, the "result" values extracted from the first and second extraction steps are checked to see if they are within or outside the range. In cases where the range values are not numbers, a String comparison can be run with the range column if the String found is part of a "negative", "positive" values dictionary.

Other non-matching strings found will not be considered. For example, Blood Type valid dictionary values A, A−, A+, B−, B+, AB+, AB−, O. If the value detected is not a string match to this valid dictionary set of values it would be flagged as abnormal, and a test can be done to see if the value is within this positive dictionary set of values. This processing serves as a "knowledge reinforcement" step because the abnormal values are generally highlighted in lab results using the heuristic extraction steps. However, this processing can possibly detect "out of range" result values where none of the first three steps have worked. In this case, the confidence of the result will be lower.

Figure 8:
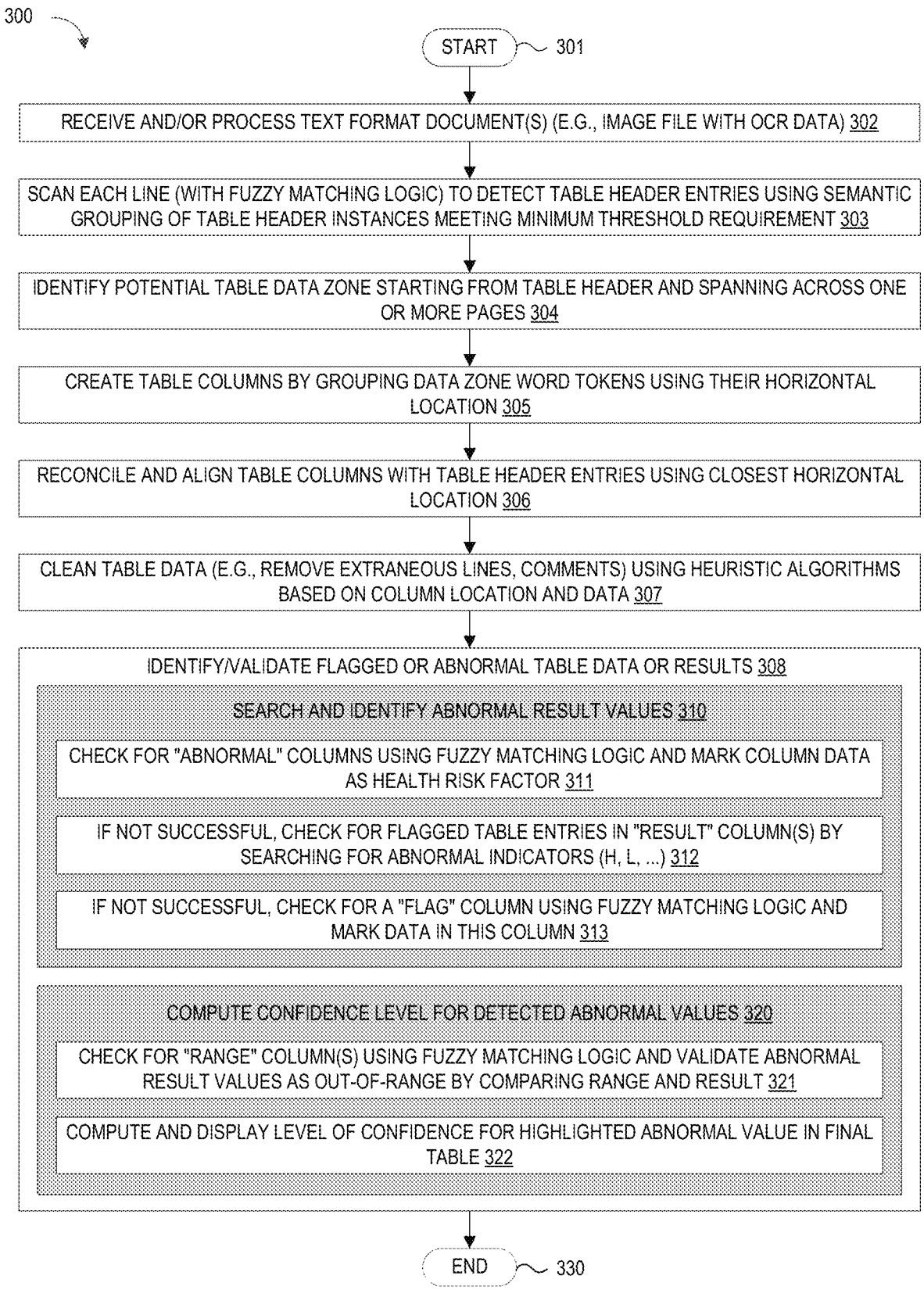
FIG. 8 illustrates a simplified flow chart showing the logic for extracting table data from input documents in accordance with selected embodiments of the present disclosure.

To provide additional details for an improved understanding of selected embodiments of the present disclosure, reference is now made to FIG. 8 which depicts a simplified flow chart 300 showing the logic for extracting table data from input documents. The processing shown in FIG. 8 may be performed in whole or in part by an information handling system 101, such as an IBM Watson cognitive machine or other suitable computing device(s) which uses a combination of semantics and character location techniques to identify and extract simple tables, such as laboratory result tables for a patient. The combination of both gives excellent results on tables that have never been identified as such in parameterization files or pre-learning phases. With the disclosed table detection and extraction algorithms, semantic meanings may be used to detect and flag any abnormal value that appears in the laboratory results table.

In FIG. 8, processing commences at 301 which may occur when an input case file is received for processing. In the ensuing method steps 302-308, input document tables are detected by using semantic grouping of known table header terms to locate table headers, performing data zone extraction processing on the document regions adjacent to detected table headers, and then grouping, aligning, and cleansing the extracted data zones to extract a final table which may be further processed.

At step 302, an input document is received and/or processed into a text format document. For example, the input document may be received as an image file (e.g., a pdf document) that is scanned with an OCR conversion process to generate a text format document. As disclosed herein, the input processing at step 302 may be performed at device 101 which receives (arrow 13) an input document 10.

At step 303, each line of the input document is scanned to detect table header entries using a semantic grouping of table header instances to identify a minimum or threshold number of table headers. For example, a dictionary-based approach may be applied in combination with a fuzzy match algorithm to find table header terms specified in a semantic groups definition file. In selected embodiments, the table header detection step 303 may be performed at the table detector engine 110 or header detection module 111 which uses a semantic groups definition file 208 to semantically compare each word in a line to a defined set of known table header terms, and then to identify a table header 11 by outputting a table header location and file to memory if a threshold number of table header terms are detected.

At step 304, a potential table data zone is identified, starting with the location of a detected table header (from step 303) and continuing across one or more pages of the input document(s). For example, white space correlation rating techniques may be applied to detect potential data zones. In selected embodiments, the data zone identification step 304 may be performed at the table detector engine 110 or data zone extractor module 112 which is configured to identify and extract data zones 12 associated with the detected table headers 11 by using raw text analysis and/or parsing logic to identify and classify data 12 that is part of the table.

Once the potential table data zone is identified, table columns are created at step 305 by grouping data zone word tokens using their horizontal location. For example, a classification process may be used to create table columns based on potential data zone locations. In selected embodiments, the table column creation step 305 may be performed at the grouping and alignment engine 113 which is configured to process the potential table data zone (from step 304) to tokenize the words in each line that are separated by a defined spacing, thereby extracting and grouping table values into columns for alignment based on text locations of each column.

At step 306, the table columns are reconciled and aligned with the table header entries using the closest horizontal location. For example, a classification process may be used to align table columns with headers by refining the location of table columns using their average location compared to the table header column locations. In selected embodiments, the table column alignment step 306 may be performed at the grouping and alignment engine 113 which is configured to reconcile the locations of table data columns (from step 305) with detected table headers (from step 303) based on text locations of the columns, and then output the result to memory as a candidate table 212.

Once the candidate table is identified, the table data is cleaned at step 307 by using heuristic algorithms which are applied the table column and data. For example, a cleansing process may be used remove extraneous lines or comments from the table. In selected embodiments, the data cleaning step 307 may be performed at the cleansing engine 114 which is configured to detect and remove table end segments and comments so that the final output table 15 is saved (output arrow 14) with a structured format.

Once a final output table is generated, the table values may be processed to identify and/or validate flagged or abnormal table data or results at step 308. Depending on the application for the table, the processing at step 308 can be used to assist with any desired computational operations, such as flagging data to be reviewed or corrected for input and ingestion into a corpus of knowledge that is processed by a cognitive computing system. In selected embodiments, the processing at step 308 may include one or more steps to search and identify abnormal result values (step 310). An example sequence of steps may include a first step 311 to check for "abnormal" columns using fuzzy matching logic and then marking every table line in the column having some data as a health risk factor. If no "abnormal" columns are detected, then a second step 312 may process table entries within any "result" column(s) to check for flagged table entries by searching for abnormal indicators (e.g., H, L, Low, High, N, Normal, etc.) contained in the table entries. If no flagged table entries are detected in the "result" column(s), then a third step 313 may check for a "flag" column in the table by using a dictionary-based approach with fuzzy matching logic, and then searching for abnormal indicators (e.g., H, L, Low, High, N, Normal, etc.) in any detected "flag" column.

In selected embodiments, the processing at step 308 may also include one or more steps to compute a confidence level for any detected abnormal values in the table (step 320). An example sequence of steps may include a first step 321 to check for "range" columns in the table by using a dictionary-based approach with fuzzy matching logic, and then validating any abnormal result values as being out-of-range by extracting the range and result values from the table and then comparing them. Based on results from comparing the range and result values, a confidence level may be computed at step 322 for any detected abnormal values in the table, and then displayed with the highlighted abnormal value(s) in the final table.

By now, it will be appreciated that there is disclosed herein a system, method, apparatus, and computer program product for processing tables embedded within documents with an information handling system having a processor and a memory. As disclosed, the system, method, apparatus, and computer program product receives an input document having embedded table data, such as medical data, and converts the input document to a text document having table data. In selected embodiments, the input document is a pdf image file which is transformed into the text document with Optical Character Reading (OCR) software. The system subsequently detecting a first table header by using semantic groupings of table header terms to identify a minimum number of table header terms in a scanned line of the text document. In selected embodiments, the first table header is detected by comparing each word of the scanned line to an XML file defining a plurality of candidate column header values that are semantically grouped into separate column categories to detect a table header term if the word matches a candidate header value, and then creating the first table header if at least two table header terms detected in the scanned line. For example, the comparison of each word to the XML, file may use a dictionary based search with fuzzy matching to detect the table header term. Once the first table header is detected, the system extracts a potential data zone by applying white space correlation analysis to a portion of the text document that is adjacent to the first table header. The potential data zone is then processed to group the potential data zone into one or more data zone columns, such as by grouping tokenized words in each line of the potential data zone into corresponding data zone columns and storing an average x location for each data zone column. In addition, each data zone column is aligned with a corresponding header column in the first table header to form a candidate table, such as by aligning the average x location for each data zone column with an x location for the corresponding header column in the first table header. Once the candidate table is constructed, data cleansing may be performed, such as by removing table comments and trailing remnant lines from the end of the candidate table. Finally, one or more columns of the candidate table are evaluated using natural language processing to apply a specified table analysis. In an example medical table application, the columns may be evaluated by validating an abnormal value indication from a first column of the candidate table by comparing a corresponding result value from a second column of the candidate table with a corresponding range value from a third column of the candidate table to detect if the result value fits within the range value.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for processing tables embedded within documents, the method comprising:
   receiving, by the system, an input document comprising embedded table data;
   converting, by the system, the input document to a text document comprising table data;
   detecting, by the system, table headers by using semantic groupings of table header terms in a semantic grouping table to identify a minimum threshold number of at least two table header terms in a scanned line of the text document;
   extracting, by the system, a table data zone by applying white space correlation function to a region of the text document that is beneath each table header;
   grouping, by the system, tokenized text lines from the table data zone to create one or more data zone columns;
   aligning, by the system, each of the one or more data zone columns with a corresponding header column in the table headers to form a candidate table;
   performing, by the system, data cleansing to remove unwanted trailing lines from the candidate table; and
   evaluating, by the system, one or more columns of the candidate table using natural language processing to extract data values and highlight abnormal values.

2. The method of claim 1, where the embedded table data in the input document comprises embedded medical data.

3. The method of claim 1, where the input document comprises a Portable Document Format (PDF) image file, and where converting the input document comprises transforming the PDF image file into the text document with Optical Character Reading (OCR) software.

4. The method of claim 1, where the detecting the table headers comprises:
   comparing, by the system, each word of the scanned line to an Extensible Markup Language (XML) file defining a plurality of candidate column header values that are semantically grouped into separate column categories to detect a table header term if the word matches a candidate header value; and
   creating, by the system, a first table header if at least two table header terms detected in the scanned line.

5. The method of claim 4, where comparing each word of the scanned line to the XML file comprises using a dictionary based search with fuzzy matching to detect the table header term.

6. The method of claim 1, where grouping one or more data zone columns to create one or more data zone columns comprises grouping tokenized words in each line of the potential data zone into corresponding data zone columns and storing an average x location for each data zone column by determining the average horizontal location of all tokenized words added to the column.

7. The method of claim 6, where aligning each of the one or more data zone columns comprises aligning the average x location for each data zone column with an exact horizontal x location for the corresponding header column in the first table header, thereby linking a data zone column to a corresponding table header.

8. The method of claim 1, where performing data cleansing to remove unwanted trailing lines from the candidate table comprises removing table comments and trailing remnant lines from the end of the candidate table.

9. The method of claim 1, evaluating one or more columns comprises validating an abnormal value indication from a first column of the candidate table by comparing a corresponding result value from a second column of the candidate table with a corresponding range value from a third column of the candidate table to detect if the result value fits within the range value.

10. An information handling system comprising:
one or more processors;
a memory coupled to at least one of the processors;
a set of instructions stored in the memory and executed by at least one of the processors to process tables embedded within documents, wherein the set of instructions are executable to perform actions of:
receiving, by the system, an input document comprising embedded table data;
converting, by the system, the input document to a text document comprising table data;
detecting, by the system, table headers by using semantic groupings of table header terms in a semantic grouping table to identify a minimum threshold number of at least two table header terms in a scanned line of the text document;
extracting, by the system, a table data zone by applying white space correlation function to a region of the text document that is beneath each table header;
grouping, by the system, tokenized text lines from the table data zone to create one or more data zone columns;
aligning, by the system, each of the one or more data zone columns with a corresponding header column in the table headers to form a candidate table;
performing, by the system, data cleansing to remove unwanted trailing lines from the candidate table; and
evaluating, by the system, one or more columns of the candidate table using natural language processing to extract data values and highlight abnormal values.

11. The information handling system of claim 10, wherein the set of instructions are executable to detect the table headers by:
comparing, by the system, each word of the scanned line to an Extensible Markup Language (XML) file defining a plurality of candidate column header values that are semantically grouped into separate column categories to detect a table header term if the word matches a candidate header value; and
creating, by the system, a first table header if at least two table header terms detected in the scanned line.

12. The information handling system of claim 11, wherein the set of instructions are executable to compare each word of the scanned line to the XML file by using a dictionary based search with fuzzy matching to detect the table header term.

13. The information handling system of claim 10, wherein the set of instructions are executable to group one or more data zone columns to create one or more data zone columns by grouping tokenized words in each line of the potential data zone into corresponding data zone columns and storing an average x location for each data zone column by determining the average horizontal location of all tokenized words added to the column.

14. The information handling system of claim 13, wherein the set of instructions are executable to align each of the one or more data zone columns by aligning the average x location for each data zone column with an exact horizontal x location for the corresponding header column in the table header, thereby linking a data zone column to a corresponding table header.

15. The information handling system of claim 10, wherein the set of instructions are executable to perform data cleansing to remove unwanted trailing lines from the candidate table by removing table comments and trailing remnant lines from the end of the candidate table.

16. The information handling system of claim 10, wherein the set of instructions are executable to evaluating one or more columns by validating an abnormal value indication from a first column of the candidate table by comparing a corresponding result value from a second column of the candidate table with a corresponding range value from a third column of the candidate table to detect if the result value fits within the range value.

17. A computer program product stored in a computer readable storage medium, comprising computer instructions that, when executed by an information handling system, causes the system to process tables embedded within documents by:
receiving, by the system, an input document comprising embedded table data;
converting, by the system, the input document to a text document comprising table data;
detecting, by the system, table headers by using semantic groupings of table header terms in a semantic grouping table to identify a minimum threshold number of at least two table header terms in a scanned line of the text document;
extracting, by the system, a table data zone by applying white space correlation function to a region of the text document that is beneath each table header;
grouping, by the system, tokenized text lines from the table data zone to create one or more data zone columns;
aligning, by the system, each of the one or more data zone columns with a corresponding header column in the table headers to form a candidate table;
performing, by the system, data cleansing to remove unwanted trailing lines from the candidate table; and
evaluating, by the system, one or more columns of the candidate table using natural language processing to extract data values and highlight abnormal values.

18. The computer program product of claim 17, further comprising computer instructions that, when executed by an information handling system, causes the system to detect the first table header by:
comparing, by the system, each word of the scanned line to an Extensible Markup Language (XML) file defining a plurality of candidate column header values that are semantically grouped into separate column categories by using a dictionary based search with fuzzy matching to detect a table header term if the word matches a candidate header value; and
creating, by the system, a first table header if at least two table header terms detected in the scanned line.

19. The computer program product of claim 18, further comprising computer instructions that, when executed by an information handling system, causes the system to group one or more data zone columns to create one or more data zone columns by grouping tokenized words in each line of the potential data zone into corresponding data zone columns and storing an average x location for each data zone column by determining the average horizontal location of all tokenized words added to the column.

20. The computer program product of claim 19, further comprising computer instructions that, when executed by an information handling system, causes the system to align each of the one or more data zone columns by aligning the average x location for each data zone column with an exact horizontal x location for the corresponding header column in the first table header, thereby linking a data zone column to a corresponding table header.

\* \* \* \* \*